(12) United States Patent
D'Angelo et al.

(10) Patent No.: US 9,523,566 B2
(45) Date of Patent: Dec. 20, 2016

(54) ELECTRIC CIRCUIT AND METHOD FOR ESTIMATING THE ANGULAR POSITION OF A ROTOR OF AN ELECTRIC MOTOR, AND DEVICE FOR CONTROLLING AN ELECTRIC MOTOR

(71) Applicant: STMicroelectronics S.r.l., Agrate Brianza (MB) (IT)

(72) Inventors: Giuseppe D'Angelo, Tufino (IT); Giovanni Moselli, S. Arpino (IT); Virginia Clemente, Montesarchio (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 102 days.

(21) Appl. No.: 14/310,536

(22) Filed: Jun. 20, 2014

(65) Prior Publication Data

US 2015/0022131 A1    Jan. 22, 2015

(30) Foreign Application Priority Data

Jul. 22, 2013  (IT) .......................... MI2013A001224

(51) Int. Cl.
*H02P 6/00* (2016.01)
*G01B 7/00* (2006.01)
*H02P 6/18* (2016.01)

(52) U.S. Cl.
CPC .................. *G01B 7/003* (2013.01); *H02P 6/18* (2013.01)

(58) Field of Classification Search
USPC ............ 318/400.32, 400.34, 400.17, 400.21, 318/400.26, 437, 489
See application file for complete search history.

(56) References Cited

U.S. PATENT DOCUMENTS

| 5,012,166 A | | 4/1991 | Ushijima et al. | |
| 5,491,393 A | * | 2/1996 | Uesugi ................... | H02K 1/276 318/400.13 |
| 5,534,763 A | * | 7/1996 | Williams et al. ....... | H02P 6/085 318/400.13 |

OTHER PUBLICATIONS

Italian Search Report and Written Opinion dated May 22, 2014 from corresponding Italian Application No. MI2013A001224.

* cited by examiner

*Primary Examiner* — Eduardo Colon Santana
*Assistant Examiner* — Iftekhar Mustafa
(74) *Attorney, Agent, or Firm* — Allen, Dyer, Doppelt, Milbrath & Gilchrist, P.A.

(57) ABSTRACT

Electric circuit for estimating the angular position of a rotor of an electric motor, including: a sensing module configured to receive at least one electric signal representative of a drive current of the electric motor and to generate a measurement signal indicative of a switching of the at least one electric signal and a switching index indicative of the type of switching, rising or falling, of the at least one electric signal; and a computing module configured to supply, from the measurement signal and switching index a position signal representative of an angular position of the electric motor rotor.

8 Claims, 2 Drawing Sheets

FIG.1
(Prior Art)
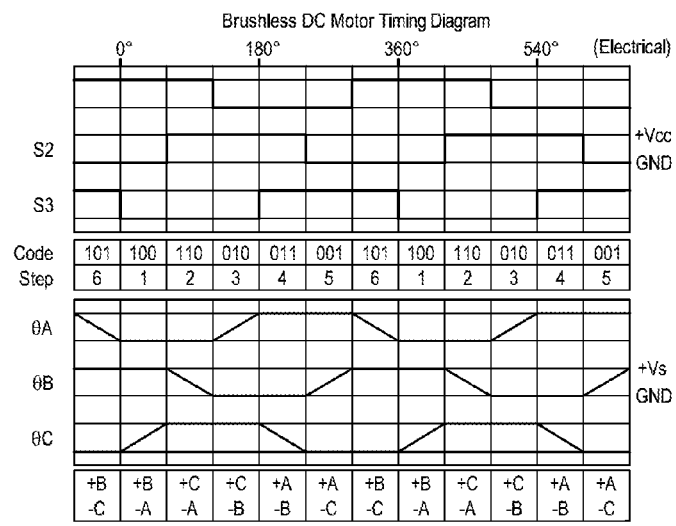
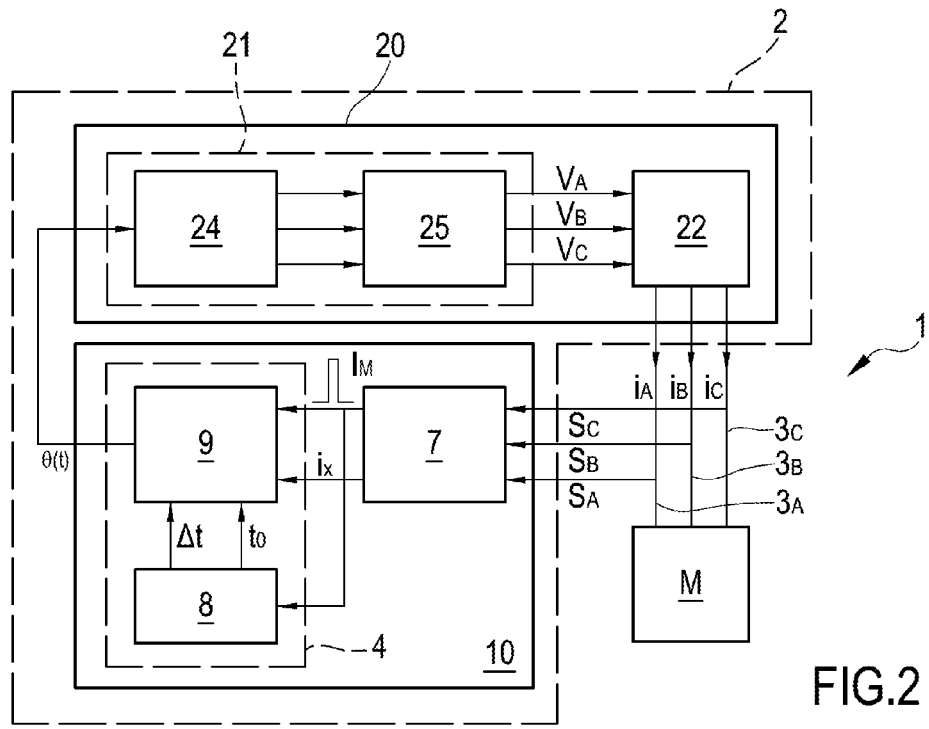
FIG.2
| Index ix | θ₀ | Detect zero-crossing |
|---|---|---|
| 0 | 0° | Rising Current Phase 1 |
| 1 | 60° | Falling Current Phase 2 |
| 2 | 120° | Rising Current Phase 3 |
| 3 | 180° | Falling Current Phase 1 |
| 4 | 240° | Rising Current Phase 2 |
| 5 | 300° | Falling Current Phase 3 |
FIG.3

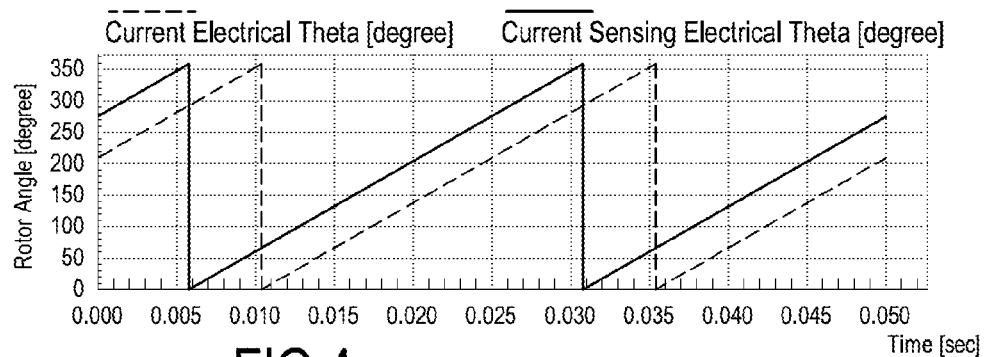
FIG.4 (THE OFFSET IS INTENTIONAL)
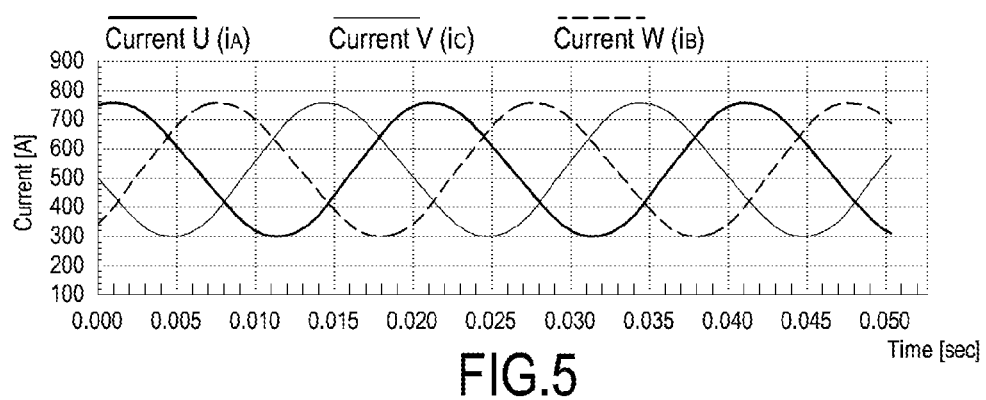
FIG.5
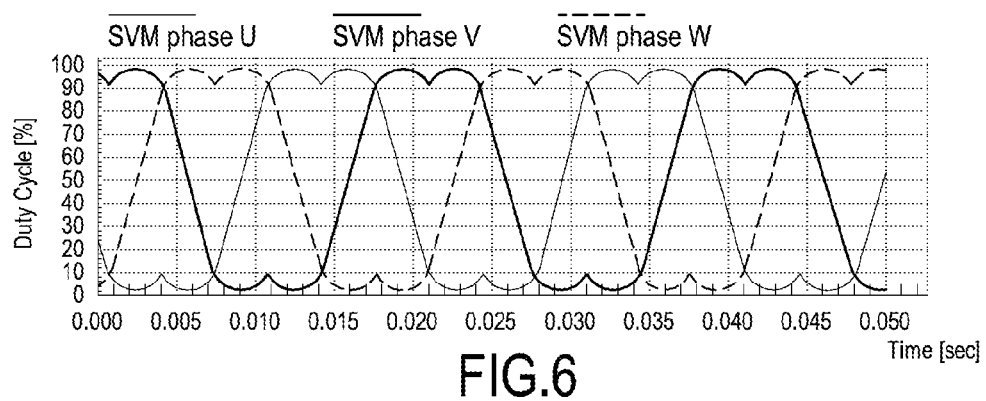
FIG.6
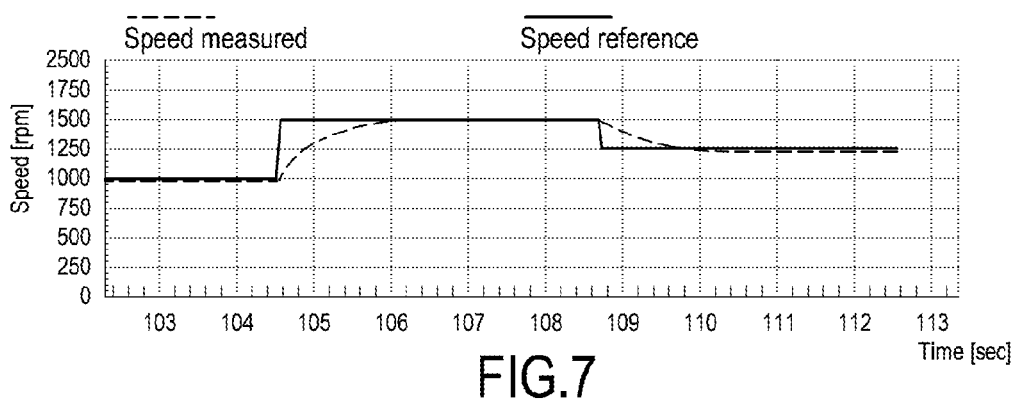
FIG.7

ELECTRIC CIRCUIT AND METHOD FOR ESTIMATING THE ANGULAR POSITION OF A ROTOR OF AN ELECTRIC MOTOR, AND DEVICE FOR CONTROLLING AN ELECTRIC MOTOR

CROSS REFERENCE TO RELATED APPLICATIONS

This application claims priority to Italian Patent Application No. MI2013A001224 filed Jul. 22, 2013, which is hereby incorporated by reference to the maximum extent allowable by law.

BACKGROUND

Technical Field

The present disclosure refers to the field of the electric motor control, and particularly to three-phase electric motors.

Discussion of the Related Art

In the area of the three-phase electric motor control, the adopted techniques typically require an accurate measurement of the angular position of the rotor and of the motor phase currents.

In some control techniques, the rotor angular position is measured through suitable position sensors directly attached to the rotor. In order to ensure a high precision, position sensors, such as for example incremental encoders and resolvers, are used, while for containing the costs and in some applications wherein sensors of position operate in harsh environments having characteristics such to compromise their operation, are used low resolution sensors such as for example Hall sensors. It is to be noted that Hall sensors ensure a precision which is sufficient just for some applications.

Therefore, control techniques, known as sensorless, were developed which indirectly determine the rotor angular position without position sensors.

A sensorless control technique provide to find the rotor position by determining the zero-crossings of the induced electromotive force or back-EMF. Indeed, the zero-crossings of the back-EMF correspond to known angular positions of the rotor having a resolution of 60 electrical degrees. By means of an outer circuit detecting such zero-crossings of the back-EMF, the rotor angular position is measured with a good precision and it is reconstructed in the intermediate time instants between two consecutive zero-crossings, through a simple linear interpolation.

Despite this technique is advantageous for various aspects, it is only used for controls wherein just two current phases in turn are excited since the back-EMF measurement is performed in the non-excited phase of the motor.

Therefore, such techniques are used in case of a trapezoidal trend of the back-EMF, such as for example the one represented in FIG. 1, referred to a brushless three-phase motor (BLDC Pittman 3441S001-R3). FIG. 1 also illustrates the trend of signals generated by Hall sensors.

Such control technique should be avoided if the aim is to induce, in the motor phases, drive electric currents having a sinusoidal trend. Indeed, in such case, it is not possible to measure the back-EFM, since all the phases are simultaneously excited.

Some approaches providing to simultaneously shutting off the excitation to the phase for a time interval sufficient to perform the measurement, are known. However, such approaches introduce a distortion of the currents which cannot be accepted for some applications. Further, such approaches require a computational load because, besides turning off and on the excitation of a phase in determined instants, it is necessary the use of an algorithm which anticipates the zero-crossing of the back-EMF in order to act in time.

Therefore, such control modes are hardly applicable in the sinusoidal control techniques or in the field-oriented control techniques, wherein the motor is simultaneously driven in all the three phases.

Other control techniques provide to measure the phase currents of the motor and to reconstruct the rotor angular position by means of complicated state observers or state sensing circuits. However, the state sensing circuits require control algorithms having a high computational complexity entailing a limitation due to the excessive run time.

SUMMARY

According to an embodiment, there is provided an electric circuit for estimating the angular position of a rotor of an electric motor, comprising a sensing module configured to receive at least one electric signal representative of a drive current of the electric motor and to generate a measuring signal indicative of a switching of the at least one electric signal, and of a switching index indicative of the switching type, rising or falling, of the at least one electric signal; and a computing module configured to supply, from the measuring signal and the switching index, a position signal representative of an angular position of the electric motor rotor.

According to an embodiment, said computing module comprises a timing block configured to receive the first measuring signal and generate time signals representative of time intervals elapsing between successive switchings of the at least one electric signal and a processing module configured to process the measuring signal, switching index, time signals and to generate the position signal.

According to an embodiment, said processing module is configured to generate said position signal representative of an actual angle of the rotor at an actual time as a function of a first time signal representing the time interval elapsed with respect to the last switching sensed by the measuring signal; a second time signal representing the time interval elapsed between the last switching sensed by the measuring signal and the preceding one; and a predefined angle value associated to the occurred switching index.

According to an embodiment, the measuring module is configured to receive a first electric signal, a second electric signal, and a third electric signal representative of a first, second and third phases of a three-phase drive current of the electric motor, and to generate a sequence of pulses of the measuring signal indicating that one of the three electric signals has crossed a reference value, and to define the switching index indicating that the electric signal switched at said reference value, has risingly or fallingly crossed said reference value.

According to an embodiment, there is provided a control device of an electric motor, comprising a control-drive module configured to receive a position signal representative of an angular position of the electric motor rotor, and generate at least one drive current of the electric motor; and an electric circuit configured to receive at least one electric signal representative of the at least one drive current, and generate the position signal, wherein the electric circuit includes a sensing module configured to receive at least one electric signal representative of a drive current of the electric motor and to generate a measuring signal indicative of a switching of the at least one electric signal, and of a switching index indicative of the switching type, rising or falling, of the at least one electric signal; and a computing module configured to supply, from the measuring signal and the switching index, a position signal representative of an angular position of the electric motor rotor.

According to an embodiment, the control-drive module is configured to implement one of the following control types: a sinusoidal control, field-oriented control, trapezoidal control.

According to an embodiment, the control-drive module comprises a control block configured to receive the position signal and generate at least one control signal according to one of the control types; and a conversion block configured to receive the at least one control signal and generate the at least one drive current of the electric motor.

According to an embodiment, the control block comprises a modulator configured to generate, from the control signal at least one modulated control signal, modulator being configured for implementing a pulse-width-modulation.

According to an embodiment, there is provided a method for estimating the angular position of a rotor of an electric motor driven by a drive current, comprising measuring the drive current and generating at least one electric signal; generating a measuring signal indicative of a switching of at least one electric signal; generating a switching index indicative of the switching type, rising or falling, of the at least one electric signal; and supplying, from the measuring signal and switching index, a position signal representative of an angular position of the electric motor rotor.

According to an embodiment, the method comprises generating time signals representative of time intervals between successive switchings of the at least one electric signal; and generating the position signal by processing the measuring signal, switching index, and time signals.

BRIEF DESCRIPTION OF THE DRAWINGS

Further characteristics and advantages of the electric circuit, control device and method will be better understood from the following description of a preferred embodiment given in an exemplifying way with reference to the attached drawings, wherein:

FIG. 1 shows time diagrams of the back-EMF and of the signals of Hall sensors of a brushless three-phase motor (Pittman 3441S001) according to the prior art;

FIG. 2 shows a block diagram of the device for controlling an electric motor, comprising an electric circuit according to at least one embodiment;

FIG. 3 shows a reference table illustrating predefined rotor rotation angles, expressed in electrical degrees, as a function of the switching of a phase of the drive electric current;

FIG. 4 shows a comparative diagram of the time versus angular position of the rotor, in a case, estimated by an application using at least one embodiment, and, in another case, evaluated by a control technique comprising an encoder (the offset is intentional);

FIG. 5 shows the trend of the phase currents with respect to the time applied to an embodiment;

FIG. 6 shows the drive waveforms of the motor with a three-phase inverter, with a duty-cycle representation with respect to the time;

FIG. 7 shows the time-varying speed waveform of the rotor, sensed by at least one embodiment.

DETAILED DESCRIPTION

A motor system 1 provided with a motor M commanded by a control device 2 is schematically shown in FIG. 2.

Particularly, motor M is a three-phase motor such as, for example, a permanent magnet-type synchronous motor such as for example, a brushless motor. According to a non-limiting specific application, the three-phase motor M can be used in the automotive field, for example, as a motor for the power steering system and/or the gearbox system or the braking system, or similar.

The three-phase motor M, which can be a standard one, comprises a plurality of supply terminals having a first terminal $3_A$, a second terminal $3_B$, and a third terminal $3_C$. Supply terminals $3_A$, $3_B$ and $3_C$ are suitably connected to the three-phase motor M stator and enable to supply the motor in order to cause the rotation of the three-phase motor rotor itself (these elements are not shown in the figures).

Supply terminals $3_A$-$3_C$ are connected to the control device 2 comprising an electric circuit 10 for estimating the rotor angular position, and a control-drive module 20 of the three-phase motor M.

Electric circuit 10 comprises a sensing module 7 which is configured to receive at least one electrical signal $S_A$, $S_B$, $S_C$ representative of a phase of the drive current $i_A$, $i_B$, $i_C$ of the three-phase motor M, or a current correlated to it. The sensing module 7 is configured to generate a measuring signal $I_M$ indicative of a switching of the at least one electric signal $S_A$, $S_B$, $S_C$ with respect to a reference value, which in an embodiment, is a ground reference. Sensing module 7 is also configured to generate a switching index $i_X$ indicative of the switching type, rising or falling, of the at least one electric signal $S_A$, $S_B$, $S_C$ in correspondence of the reference value.

In addition, the electric circuit 10 comprises a computing module 4 configured to supply, from the measuring signal $I_M$ and switching index $i_X$, a position signal $\theta(t)$ representative of an angular position of the electric motor M rotor.

In an embodiment, computing module 4 comprises a timing block 8 configured to receive the measuring signal $I_M$ and generate a first and second time signal, $\Delta t$ and $t_0$, representative of time intervals occurring between following switchings of the at least one electric signal $S_A$, $S_B$, $S_C$.

Further, computing module 4 comprises a processing module 9 configured to process the measuring signal $I_M$, switching index $i_X$, first and second time signals, $\Delta t$ and $t_0$, and generate the position signal $\theta(t)$ of the rotor at the actual time t.

In the embodiment shown in FIGS. 2 and 3, electric motor M is a three-phase motor and sensing module 7 is configured to receive the three electric signals $S_A$, $S_B$, $S_C$ representative of the three phases, respectively, of the drive current $i_A$, $i_B$, $i_C$. According to an embodiment, the first, second and third current sensors, for example shunt resistors, not shown in the figure, are connected to terminals $3_A$, $3_B$, $3_C$ and are configured to respectively measure the first phase $i_A$, second phase $i_B$, and third phase $i_C$ of the drive current, and supply the corresponding three electric signal $S_A$-$S_C$. Sensing module 7 can be configured for possible processings of the sensed signals and to comprise analog-digital converters, low-pass filters for cancelling the noise, suitably connected to the current sensors.

It is well to observe that, in case the windings of the three-phase motor M have a star-connection, only two of the phases of the drive current are sensed, because the third phase is determined by the other two based on the first Kirchhoff law.

Sensing module 7 comprises a sampling block, not shown in the figures, configured to independently sample each of the three electric signals $S_A$-$S_C$. In an embodiment, the sampling block is a measuring block driven at constant time intervals, whose time constant value depends on the required accuracy.

Moreover, sensing module 7 is configured to compare the three sampled electric signals $S_A$-$S_C$ with a reference value and generate a pulse $i_m$ when one of the three digital signals $S_A$-$S_C$ crosses each time the reference value. Sensing module 7 is further provided with a sign sensing block, which is also not illustrated in the figures, which is configured to compare the sampled electric signals $S_A$-$S_C$ with further reference values and identify the sign reversal which each electric signal $S_A$-$S_C$ has in correspondence of the reference value crossing, defining at the same time corresponding switching indexes $i_x$.

Generally, the reference value is a ground reference, however it can be also equal to Vcc/2, wherein Vcc is the supply voltage value of the measuring device (ADC of the microcontroller). In such case, sensing module 7 enables to monitor the sign inversion of a signal [Sx-(Vcc/2)], wherein Sx is one of the three electric signals $S_A$, $S_B$, $S_C$. In the illustrated embodiment, switching index $i_X$ is one of the values from 0 to 5 comprised in the table of FIG. 3, wherein a predefined angle value $\theta_0$, expressed in electrical degrees, is associated to each switching index $i_x$. In other words, each falling or rising switching of each electric signal $S_A$-$S_C$ is associated to a switching index $i_X$ and to a corresponding angle of the rotor position.

The timing block 8 is configured to receive the pulses $i_m$ of the measuring signal $I_M$ and generate the first time signal $\Delta t$, representing the elapsed time interval with respect to the elapsed received pulse $i_m$, and the second time signal $t_0$ representing the last time interval between the last pulse $i_m$ and the preceding one.

By keeping in mind that the period T of the phases of the drive currents of the three-phase motor M is equal to one electric rotation of the rotor, the first time signal $\Delta t$ and the second time signal $t_0$ are the time for the rotor to go through successive angles of 60°, measured in electrical degrees.

Timing block 8 is configured so that when each pulse signal $i_m$ of the measuring signal $I_m$ is received, the value of the second timing signal $t_0$ is updated to the first timing signal $\Delta t$, and the value of the first timing signal $\Delta t$ is reset.

The processing block 9 is configured to generate the angular position signal $\theta(t)$ of the three-phase motor M rotor, expressed in electrical degrees, at the actual time t according to the formula:

$$\theta(t)=(\Delta t/t_0)*60°+\theta_0$$

wherein the predetermined angle value $\theta_0$ is found in the table of FIG. 3 which respect to the switching index $i_X$.

Now it is considered the control-drive module 20 adapted to implement the control device 2.

In the shown embodiment, the control-drive module 20 is configured to receive the position signal $\theta(t)$ and generate the corresponding three drive signals $i_A$-$i_C$ of the three-phase motor M and comprises a control block 21 associated to a conversion block 22.

Control block 21 is connected to the processing block 9 receiving at its input the position signal $\theta(t)$ and supply at the output three voltage signals $V_A$, $V_B$, and $V_C$ adapted to be supplied to the conversion block 22.

In an embodiment, control block 21 comprises a controller 24 associated to a modulator 25. Modulator 25 is configured to generate, from the control signal, at least one modulated control signal $V_A$, $V_B$, $V_C$, modulator 25 being configured to implement a pulse width modulation (PWM). PWM modulation can be of the SVM type, or can be an inverse Clarke transform block.

Conversion block 22 is configured to supply, to the windings of the three-phase motor M stator, the three corresponding AC drive signals $i_A$, $i_B$, $i_C$, obtained on the basis of the voltage signals $V_A$, $V_B$ and $V_C$ possibly modulated, generated by the control module 21 with reference to the position signal $\theta(t)$ of the rotor estimated by the electric circuit 21. In an embodiment, the conversion block 22 is an inverter.

At least one embodiment also provides a method for estimating the angular position, expressed in electrical degrees, of a rotor of an electric motor M, by means of a measuring electric circuit 10 of the above-mentioned type, the same parts and features having the same structure and operation will be identified by the same signs and reference numbers.

In an embodiment, motor M is a three-phase electric motor driven by a drive current $i_A$, $i_B$, $i_C$.

The method comprises:
measuring each phase of the drive current $i_A$-$i_C$, and generating corresponding electric signals $S_A$-$S_C$;
generating a measuring signal $I_m$ comparing the drive electric signals $S_A$-$S_C$ with a reference value;
generating a switching index $i_X$ indicative of the switching type, rising or falling, of the at least one electric signal $S_A$-$S_C$; and
allocating to each switching of the at least one electric signal $S_A$-$S_C$, a predetermined angle value $\theta_0$ of the rotor, expressed in electrical degrees.

In an embodiment, the reference value is a ground value and measuring signal $I_M$ is a pulse signal whose pulse $i_m$ is generated when an electric signal $S_A$-$S_C$ crosses the ground reference. In other embodiments, the reference value is equal to value Vcc/2, wherein Vcc is the supply voltage value of the measuring device (ADC of the microcontroller). In such a case, measuring signal $I_m$ is a pulse signal, whose pulse $i_m$ is generated for detecting the sign reversal of a signal [Sx-(Vcc/2)] wherein Sx is one of the three electric signals $S_A$, $S_B$, $S_C$.

Switching index $i_X$ is indicative of the signal reversal of the at least one electric signal $S_A$-$S_C$ when the reference value is crossed.

The method provides to:
sense the time interval between successive pulses $i_m$ of the measuring signal Im and allocate such values to a first time signal $\Delta t$ and a second time signal $t_0$;
calculate the value of the position angle $\theta(t)$ of the rotor, at a pulse $i_m$ of the measuring signal Im, at an actual time t according to the formula:

$$\theta(t)=(\Delta t/t_0)*60°+\theta_0$$

wherein:
$\Delta t$ is the time elapsing from the last pulse $i_m$ of the measuring signal Im, in other words, the time elapsing from a preceding reference value crossing of the at least one electric signal $S_A$-$S_C$;
$t_0$ is the time elapsing between the last pulse $I_m$ and the preceding one;
$\theta_0$ is the predetermined angle value associated to the switching index $i_X$ regarding the last occurred pulse $i_m$.

According to an embodiment, in correspondence of the arrival of a pulse signal $i_m$ of the measuring signal Im, the method provides to:
- update the value of the second time signal $t_0$ to the value of the first time signal $\Delta t$, and
- reset the first time signal $\Delta t$.

Now, it is described a method for controlling a three-phase motor M providing to use the estimated rotor position signal $\theta(t)$ by processing the electric signals $S_A$-$S_C$ representative of the drive electric current $i_A$-$i_C$.

The method provides to:
- measure each of the three phases of the drive electric current $i_A$-$i_C$;
- generate pulse signals $i_m$ at the reference value crossing of each electric signal $S_A$-$S_C$;
- determine the switching index $i_X$ of the electric signal $S_A$-$S_C$ when the reference value is crossed; and
- determine the predefined angle value $\theta_0$, expressed in electrical degrees, associated to the elapsed switching index $i_X$.

Specifically, as shown in FIG. 3, each switching index $i_X$ which distinguishes a rising or falling switching of each electric signal $S_A$-$S_C$, is associated to a predefined angle value of the rotor position $\theta_0$.

The method provides to detect the time intervals between successive pulses $i_m$ of the measuring signal $I_M$ for updating the value of the first time signal $\Delta t$ and second time signal $t_0$.

Therefore, the method provides to generate the position signal $\theta(t)$ representative of the rotor angle, expressed in electrical degrees, at the actual time, according to the formula:

$$\theta(t)=(\Delta t/t_0)*60°+\theta_0$$

Therefore, the method provides to:
- compare the estimated position signal $\theta(t)$ with a predetermined position signal, and generate corresponding drive voltage signals $V_A$-$V_C$ based on such comparison;
- supply to the electric motor M, AC drive signals $i_A$-$i_C$ corresponding to such voltage signals $V_A$-$V_C$.

The control method can also comprise a modulation of the at least one drive voltage signal $V_A$-$V_C$ in order to generate current signals $i_A$-$i_C$ to the windings of the electric motor M stator.

The described electric circuit and method provide the possibility of implementing different types of control of the electric motor M, among them: a sinusoidal control, a field-oriented control or a trapezoidal control.

Experimental Results

The Applicant could implement the control circuit 2 in a hardware and/or software form and, for example, by a microcontroller of the ST10 family. The implemented system comprises an evaluation board of the ST10F276 type, a power board and a brushless three-phase motor of the BLDC Pittman 344S0001-R3 type.

The Applicant could implement a control of the rotor position of the motor driven by means of a sinusoidal three-phase current. As illustrated in FIG. 4, it was possible to evaluate the validity of what has been described by considering that the results of the estimated position by the present measuring circuit, represented by a solid line, can be overlapped on the results obtained by a known method for high performances such as the sinusoidal control method by an incremental encoder, shown by a broken line. In FIG. 4, in order to better illustrate the obtained results, the angles have been offset by a constant offset.

FIG. 5 illustrates the phases of the electric drive current of the implementation wherein the results are illustrated in FIG. 4, and FIG. 6 shows the drive waveforms of the three-phase inverter which give an index of the quality of the implementation.

It is well to observe that the measuring circuit and the method can be also used for redundantly estimating the angular position of the rotor in "sensored safety-critical" applications.

The electric circuit and the method can be used not only for applications having constant rotation speeds of the rotor, but also for estimating the rotor angular position in dynamic applications wherein the motor rotor has a time-varying speed.

The proposed technique overcomes the drawbacks of the prior art and to simply reconstruct, by accurate and efficient estimates, in a sensorless mode, the angular position of the rotor, without affecting the computational complexity of the control algorithm.

Specifically, the electric circuit enables to sense the rotor position independently from the simultaneously excited phases.

Moreover, the proposed technique enables to find from the estimated rotor angular position $\theta(t)$ the rotor speed of the electric motor M by a shunting block.

Further, it is well to highlight that the circuit, device and method according to the invention can be applied to complicated controls since they are independent from the number of the simultaneously excited phases.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An electric circuit for estimating the angular position of a rotor of an electric motor, comprising:
   a sensing module configured to receive at least one electric signal representative of a drive current of the electric motor and to simultaneously generate
   a measuring signal indicative of a switching of the at least one electric signal, and
   a switching index indicative of the switching type, rising or falling, of the at least
   one electric signal; and
   a computing module configured to supply, from the measuring signal and the switching index, a position signal representative of an angular position of the electric motor rotor, said computing module comprising
   a timing block configured to receive pulses of the measuring signal and generate a first timing signal representing an elapsed time interval with respect to an elapsed received pulse, and a second time signal representing a last time interval between a last pulse and a preceding one, and
   a processing module configured to process the measuring signal, switching index, and the first and second timing signals so as to generate the position signal.

2. The electric circuit according to claim 1, wherein said processing module is configured to generate the position signal representative of an actual angle of the rotor at an actual time as a function of the first and second timing signals and a predefined angle value associated to the occurred switching index.

3. The electric circuit according to claim 1, wherein said measuring module is configured to
- receive a first electric signal, a second electric signal, and a third electric signal representative of a first, second and third phases of a three-phase drive current of the electric motor;
- generate a sequence of pulses of the measuring signal indicating that one of the three electric signals has crossed a reference value; and
- define the switching index indicating that the electric signal switched at the reference value, has risingly or fallingly crossed the reference value.

4. A control device of an electric motor, comprising:
- a control-drive module configured to receive a position signal representative of an angular position of the electric motor rotor, and generate at least one drive current of the electric motor; and
- an electric circuit configured to receive at least one electric signal representative of the at least one drive current, and generate the position signal, said electric circuit comprising
- a sensing module configured to receive the at least one electric signal and to simultaneously generate
- a measuring signal indicative of a switching of the at least one electric signal, and a switching index indicative of the switching type, rising or falling, of the at least one electric signal, and
  - a computing module configured to supply, from the measuring signal and the switching index, a position signal representative of the angular position of the electric motor rotor, said computing module comprising
    - a timing block configured to receive pulses of the measuring signal and generate a first timing signal representing an elapsed time interval with respect to an elapsed received pulse, and a second time signal representing a last time interval between a last pulse and a preceding one,
  - and a processing module configured to process the measuring signal, switching index, and the first and second timing signals so as to generate the position signal.

5. The control device according to claim 4, wherein said control-drive module is configured to implement one of the following control types: a sinusoidal control, field-oriented control, trapezoidal control.

6. The control device according to claim 4, wherein said control-drive module comprises:
- a control block configured to receive the position signal and generate at least one control signal according to one of the control types; and
- a conversion block configured to receive the at least one control signal and generate the at least one drive current of the electric motor.

7. The control device according to claim 6, wherein said control block comprises a modulator configured to generate, from the control signal at least one modulated control signal, with said modulator being configured for implementing a pulse-width-modulation.

8. A method for estimating the angular position of a rotor of an electric motor driven by a drive current, comprising:
- measuring the drive current and generating at least one electric signal;
- simultaneously generating a measuring signal indicative of a switching of at least one electric signal, and a switching index indicative of the switching type, rising or falling, of the at least one electric signal; and
- supplying, from the measuring signal and switching index, a position signal representative of an angular position of the electric motor rotor, the supplying comprising
  - receiving pulses of the measuring signal, and generating a first timing signal representing an elapsed time interval with respect to an elapsed received pulse, and a second time signal representing a last time interval between a last pulse and a preceding one, and
  - processing the measuring signal, switching index, and the first and second timing signals so as to generate the position signal.

* * * * *